HYDROCARBON CONVERSION PROCESS AND APPARATUS THEREFOR

Filed May 9, 1952 2 Sheets-Sheet 1

INVENTOR.
John S. Hicks
BY
Charles A. Huggett
ATTORNEY

May 29, 1956 J. S. HICKS 2,748,060

HYDROCARBON CONVERSION PROCESS AND APPARATUS THEREFOR

Filed May 9, 1952 2 Sheets-Sheet 2

INVENTOR.
John S. Hicks
BY
Charles A. Huggett
ATTORNEY

United States Patent Office 2,748,060

Patented May 29, 1956

2,748,060

HYDROCARBON CONVERSION PROCESS AND APPARATUS THEREFOR

John S. Hicks, Wenonah, N. J., assignor to Socony Mobil Oil Company, Inc., a corporation of New York Application May 9, 1952, Serial No. 286,953

13 Claims. (Cl. 196—50)

This invention pertains to the continuous contacting of vapors with a moving mass of particle form solid granular material. It is particularly directed to improvements in continuous hydrocarbon conversion systems which use gravitating beds of hot solid contact material for effecting a rearrangement of the molecular structure of the hydrocarbons.

There are a variety of processes which utilize moving masses of solids as a catalytic or heat transfer medium, such as hydrogenation, cyclization, desulfurization, dehydrogenation and catalytic cracking of hydrocarbons. A preferred system incorporates reaction and regeneration vessels in which granular solids are gravitated downwardly as substantially compact columns and the solids are transferred from the bottom of one vessel to the top of the other to complete an enclosed cyclic path. Hydrocarbons are passed continuously through the solids bed in the reaction vessel and air is passed through the solids bed in the regeneration vessel to burn off carbonaceous deposits picked up by the solids in the conversion vessel.

A variety of substances have been used as the granular solid material in these processes. For example, natural or treated clays, such as bauxite or kaolin are used or synthetics, such as alumina, silica, alumina-silica. These materials are used in catalytic cracking in a size range of about 3–60 mesh broadly, and preferably about 4–10 mesh, Tyler standard screen analysis. In other processes, other sizes may be used. For instance, when the particles are non-catalytic, merely serving as a heat carrier, it may be desirable to use larger particles. The particles may be in the form of pellets, pills or spheres of substantially uniform shape or they may be of irregular, non-uniform shape.

In catalytic cracking processes, the reaction zone may be maintained at about 800–1100° F., and the regeneration zone may be maintained at about 1000–1300° F. The walls of the vessel must be made of special steel designed to retain its strength at high temperatures. These special high temperature materials are expensive and difficult to obtain. The pressure in the reaction zone may be about 5–50 pounds per square inch. The vessel must be, therefore, capable of being pressured to that extent at the high temperature involved. In reforming processes, the pressure in the reaction zone may be materially higher than above, for example, 5–400 p. s. i. or thereabouts. In other processes, the reaction temperature may be in the range of 800–1400° F. and the pressure may be 50–600 pounds per square inch.

It is a major object of this invention to provide an improved method and apparatus for conducting high temperature reactions which overcomes the above-mentioned difficulties.

It is a further object of this invention to provide an improved method and apparatus for conducting high temperature reactions which require only a minimum of materials capable of withstanding very high temperatures.

It is a further object of this invention to provide an improved method of and apparatus for conducting high temperature conversion reactions at high pressure in the presence of a gravitating mass of hot contact material.

In one form of the invention, a single solid stream of contact material is split into two streams with part being directed through a central reaction zone and the other part being directed through an annular heat insulation zone in substantially compacted form. Later the two streams are re-combined. The solid material in the annular zone acts as insulation, rather than as a heat carrying means. The rate of flow of the solid material in the annular passage is maintained very low, being only a minor fraction of that through the reaction zone. And further, in order to prevent hot reactant vapors from flowing through the insulation passage and thereby heating the outer shell and coking the contact material, a seal gas is introduced into the annular passage to keep out the objectionable vapors. Inasmuch as high vapor rates reduce the film coefficient of the gas in the heat insulation zone and promote high heat transfer rates from the reaction zone to the annular zone, this undesirable feature is avoided in the present invention by maintaining the seal gas flow rate in the annular zone not substantially above that needed to prevent entry of reactant vapors into the annular zone. In the preferred form of the invention, the solids stream is at a temperature substantially below the average temperature in the reaction zone prior to the splitting of the stream into two parts. The solids passing through the annular passage are at a temperature substantially below the reaction zone average temperature. However, the cool solids entering the reaction zone are rapidly heated therein to a high temperature.

The invention may be most easily understood by reference to the attached drawings and the following detailed description.

The above-indicated drawings used to illustrate the invention are all highly diagrammatic in form.

Figure 1:
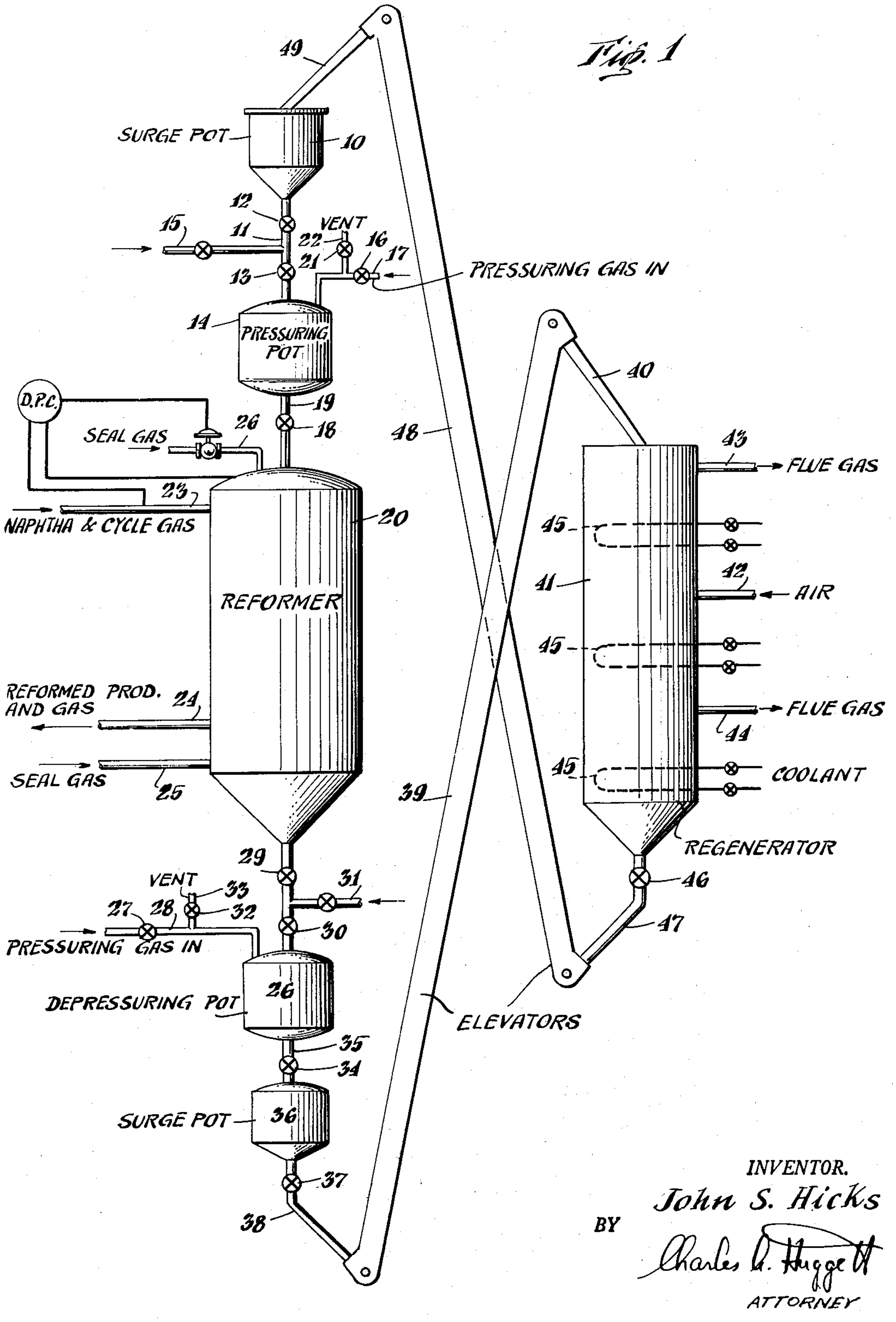
Figure 1 is an elevational view, of a conversion system in which the invention can be practised.

Turning now to Figure 1, a unitary moving bed reforming system is shown which includes a high pressure reformer depressuring and pressuring pots located both above and below, surge vessel located above and below, and a regenerator located alongside the reformer. The vessels are interconnected effecting a continuous flow path for the granular material. The reformer is designed generally for operation at advanced pressure whereas the regenerator is usually designed to operate at substantially atmospheric pressure.

In operation, granular contact material is gravitated downwardly from the surge pot 10 through the conduit 11 when the valves 12, 13 are opened. When the pressure pot 14 has been filled, the valves 12, 13 are closed and seal gas is introduced at high pressure through the conduit 15. Valve 16 in conduit 17 is opened to introduce pressuring gas into the seal pot. When the pressure in the pot 14 is brought up to the pressure in the reformer, which may be, for example, 175 pounds per square inch (gauge), the valve 18 is opened, causing the solids to flow through the conduit 19 into the reformer 20. The valve 18 is then closed, the valve 16 in conduit 17 closed and the valve 21 in conduit 22 opened to vent the pressure pot 14.

Naphtha and cycle gas are introduced into the reformer 20 through the conduit 23 and they travel downwardly through the contact material. The reformed product and gas are withdrawn through the conduit 24 to further processing apparatus not shown. An inert seal gas is introduced into the top and bottom of the vessel 20 through conduits 25 and 26 to confine the reactants and products to the desired flow path. Periodically, the pressure in the pot 26 is brought up to that in the reformer 20 by opening valve 27 in conduit 28 and the valves 29 and 30 are opened to permit withdrawal of a portion of the solids from the bottom of the reformer. The valves 29, 30 are then closed and the pressure between the valves is increased by introducing inert gas through the conduit 31. The valve 27 is closed and the valve 32 is opened to permit gas to escape from the pressure pot 26 through the vent conduit 33. The valve 34 in conduit 35 is opened to provide for the withdrawal of solids from the pressure pot 26 to the surge pot 36. The valve 37 is used to control the flow rate of the solids from the surge pot 36 through the conduit 38 to the bottom of the elevator 39. The solids are discharged from the top of the elevator 39 through the conduit 40 into the top of a regenerator 41.

The regenerator 41 is preferably operated at or near atmospheric pressure such as, for example, 2 pounds per square inch gauge. The contact material is gravitated as a descending mass through the vessel. Air is introduced into the bed of solids through the conduit 42 and flue gas is withdrawn through the conduits 43, 44. Cooling coils 45, 45 may be located within the vessel to control the temperature of the contact material. The maximum temperature in the vessel 41 may be considerably higher than the discharge temperature because of the low circulation rate of the solid material. For example, the temperature within the vessel may reach 1200° F. whereas the solid material may be discharged at say 500° F. The valve 46 in the conduit 47 is used to control the flow rate of the solids through the regenerator 41. The elevator 48 is used to lift the regenerated solid material to the surge pot 10 via the conduit 49.

Figures 2, 3:
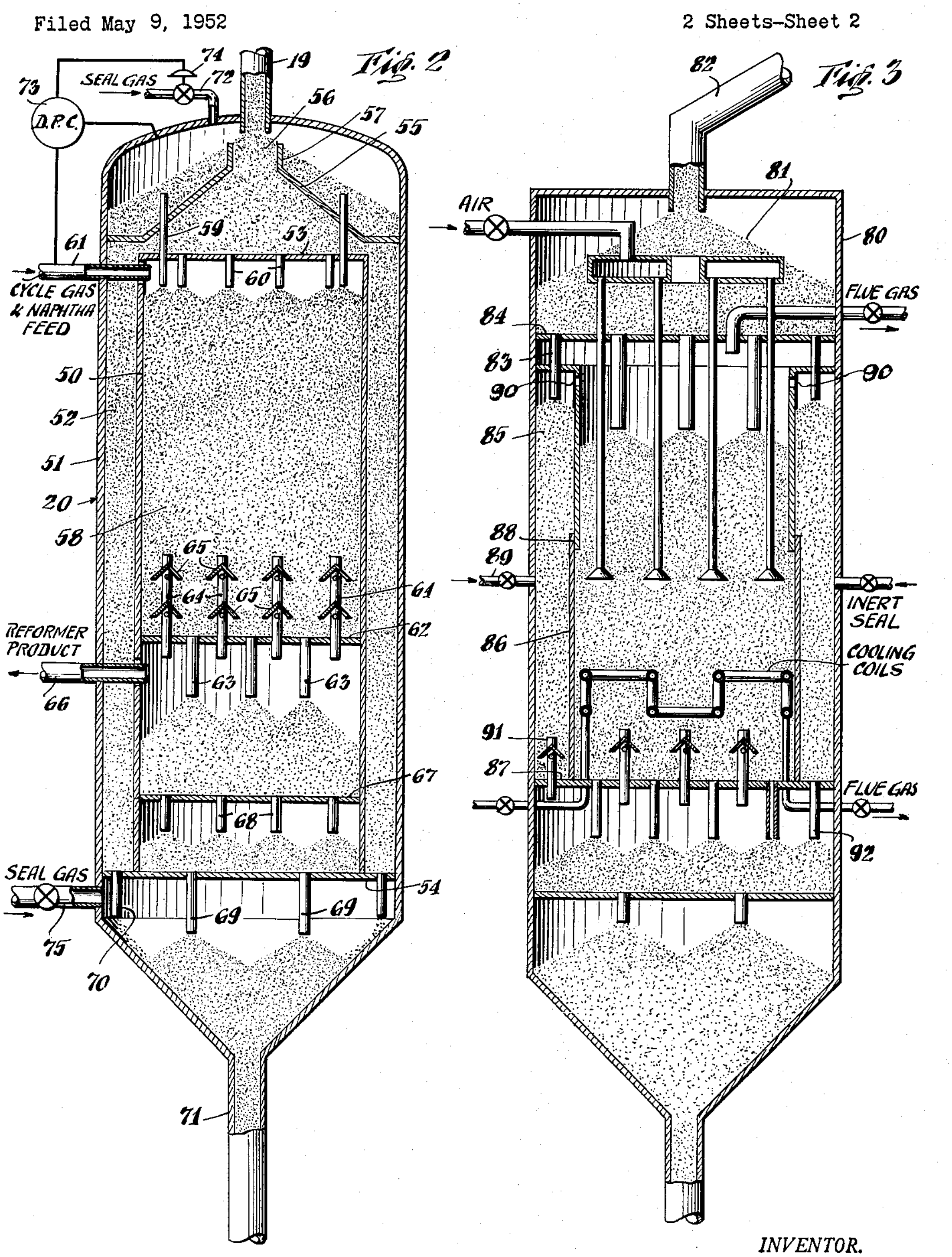
Figure 2 is an elevational view, partly in section, of the reformer of Figure 1.
Figure 3 shows a regenerator adapted for operation according to the method of this invention.

Referring now to Figure 2, the interior of the reformer 20 will be disclosed. The solids enter the top of the vessel through the conduit 19. The vessel is seen to have inner and outer walls 50, 51 which provide an annular passageway 52 therebetween for the downward transfer of a relatively thin stream of contact material. A horizontal partition plate 53 is located at the top of the inner wall 50. The inner wall 50 rests on a horizontal floor 54, which extends across the vessel 20 and which is attached to the outer wall 51. A confining baffle 55 is located in the upper portion of the reformer above the partition plate 53. This baffle has a generally conical shape with side walls disposed at an angle with the horizontal slightly greater than the angle of repose of the solid material. The angle of repose is that angle assumed by the solids when poured onto a pile of the material, being usually for granular contact catalyst about 30 degrees. The confining baffle 55 keeps the solids confined whereby the fines, or small particles, of powder size, are prevented from separating from the granules and classifying into objectionable streams. An aperture 56 is located in the top of the baffle 55 just beneath the conduit 19 to receive the solid material. A retaining wall 57 is located about the aperture, being extended upwardly to a level just below the bottom of the conduit 19. Solids fill the reaction chamber 58 and overflow the wall 57 to form a pile on the top of the confining baffle 55. The solids on the top of the baffle 55 are transferred through the conduits 59 into the reaction chamber 58. When the solids flow into the vessel 20 faster than they are withdrawn, the level of contact material above the baffle 55 rises and when the opposite occurs, the level falls. The space above the baffle 55 serves, therefore, as a surge chamber to allow for fluctuation in the flow of the solid material through the system.

The drop pipes 60 attached to the plate 53 transfer the bulk of the contact material to the reaction chamber. The baffle 55 is located sufficiently above the plate 55, however, to permit an annular stream of solids to pass downwardly from beneath the baffle 55 between the inner and outer walls. Cycle gas and naphtha feed are introduced through the conduit 61 into the region about the drop pipes 60 and the fluids travel downwardly through the bed of solids. The conduit 61 makes sliding contact with the inner wall 50, thereby allowing for the relief of temperature stresses in the metal. A partition 62 is located across the reaction chamber 58 at the bottom of the reaction zone. Drop pipes 63 are attached to partition 62 to transfer the solids and provide a suitable gas disengagement space. The collecting pipes 64 are located vertically above the partition. The pipes 64 have suitable apertures for gas withdrawal from the bed. The apertures are shielded by hoods 65 to prevent entrainment of particles in the gas stream. The reformate is removed from the vessel 20 through the conduit 66. The conduit 66 has a sliding connection with the inner wall 50, similar to conduit 61. Another partition 67 is located across the chamber 58 at a level below conduit 66 to inhibit downward movement of reformer product with the contact material. Drop pipes 68 confine the flow of contact material into paths of restricted cross-section, thereby aiding in the prevention of downward movement of reaction products. The solid material is gravitated through the drop pipes 69 into the lower section of the vessel 20. Drop pipes 70 are also attached to the floor 54 but about the periphery thereof beneath the annular passageway 52, to effect withdrawal of the annular stream of contact material. The two streams of contact material are recombined, therefore, in the bottom of the vessel 20 and withdrawn from the vessel through the conduit 71.

The flow rate of the solids through the annular passageway is limited by the size and number of the conduits 70 and is normally restricted to only a minor fraction of the flow through the reaction chamber 58. In any event, the downward velocity of the particles in the passageway is restricted to a minor fraction of the downward velocity of the particles through the reaction chamber. The particles in the annular zone serve, therefore, as a heat insulating medium, so that the temperature of the outer wall 51 is maintained substantially lower than that of the inner wall 50. A seal gas, such as seal steam or cycle gas (gas containing hydrogen separated from the reformer products and recycled for reuse in the reaction zone) used as a seal gas is introduced into the upper portion of the vessel 20 via the conduit 72. A differential pressure controller 73 is used to control the valve 74 in order to maintain the pressure above the plate 53 just slightly higher than the pressure below the plate. For example, if the pressure at the top of the reaction bed is about 175 pounds per square inch, the pressure in the top of vessel 20 is maintained at about 176 pounds. The pressure below the plate 62 may be 172 pounds per square inch in order to insure sufficient gas flow through the bed. The seal gas flows downwardly through the contact material, part flowing into the reforming zone via the pipes 60, and part into the annular passage 52. This keeps the hot reformer charge out of the annular passage. In the absence of the high pressure seal gas, the reformer charge would flow in part downwardly through the annular passage because of the pressure drop across the reaction bed. Since the annular passage communicates with the reforming zone both at the top and bottom thereof, the inner wall is not required to hold much pressure. The pressure is taken largely by the outer wall, which is maintained at a substantially lower temperature than the inner wall. By passing a seal gas through the annular passage, coke formation and liquid condensation on the solid contact material in the passage is prevented. The cycle seal gas may be at moderate temperature, for example, 500–800° F. If desired, a seal gas temperature as low as 100–400° F. may be used. The pressure of the seal gas should not be materially higher than the pressure in the reaction zone in order to limit the gas flow through the annular passage. High gas rates through the solid material reduce the film coefficient and promote high heat transfer rates from the central zone to the annular zone. In this invention it is desirable to avoid high heat transfer rates to maintain the outer wall of the vessel at the lowest possible temperature and hence, the gas flow rate through the passage is limited. The pressure in the annular passage is maintained above the pressure in the reaction zone, while the gas flow through the passage is maintained as low as possible. A seal gas is introduced into the lower portion of the vessel via the conduit 75 at a pressure of say, for example, 173 pounds per square inch. This prevents reaction products from moving downwardly with the solids. Inasmuch as gas flow rates through the mass of solids above and below the reaction zone are low, no special insulating method or means is needed at those locations.

In a preferred form of this invention, the contact material is introduced into the reactor at a temperature substantially below the average temperature in the reaction zone. For example, the contact material may leave the burning zone of the kiln of Figure 1 at 1000–1200° F. but is then cooled to 300–600° F. before being passed through the valves above and below the pressuring pot 14. This feature permits easy lubrication of the valves and prevents excessive valve wear. The stream of contact material would, therefore, enter the reformer at about 300–600° F. The stream of solids entering the reforming zone is rapidly heated to the reforming temperature of about 900–1100° F. in the upper 2–12 inches of the bed by the very hot mixed naphtha and cycle gas feed. The catalyst circulation rate through the reformer is relatively low so that the heat capacity of the vapor-gas feed stream is much greater than that of the catalyst. The stream of catalyst enters the annular zone at a temperature of 300–600° F., and hence, in this operation there is automatically a hot bed of solids in the reforming zone and a substantially cooler bed in the annular passage, and particularly in that portion of the passage nearest the outer shell of the vessel. This is always true in those processes in which the heat capacity of the vapor feed stream controls the temperature in the reactor and the reaction heat is being supplied by that stream. It applies as well for concurrent, countercurrent or split flow, and the invention is to be considered broad to all three methods of supplying reactants to the bed.

Referring now to Figure 3, there is shown a regenerator 80 adapted for operation according to the method of this invention. Catalyst from the reactor is introduced into the top surge zone 81 via the pipe 82. Part of the catalyst is transferred via the drop pipes 83 in the partition 84 to the insulating passage 85 at that temperature, in order to keep the outer housing walls at a low temperature, thereby permitting the use of carbon steel. In the central zone of the kiln, defined by the liner wall 86 and upper and lower partitions 84, 87, the temperature is maintained about 900–1400° F. The liner wall 86 may be a refractory material or it may be a steel designed for operation at high temperatures. The liner 86 has a slip joint connection 88 located in the liner 86 to relieve temperature stresses. An inert gas is introduced into the annular zone through the pipe 89 to travel upwardly and downwardly through the annular column. The gas is discharged into the burning zone through the orifices 90 in the top of the liner 86 and the pipes 91 in the partition 87. The main purpose of the inert seal gas is to prevent the flow of the hot kiln gases through the annular passage, and therefore, the amount of inert gas flowing through the annular passage is maintained too low to effect any substantial amount of cooling of the solids. A high rate of gas flow is undesirable because it decreases the insulating effectiveness of the annular passage (i. e. reduces the film coefficients). The flow rate of the solids through the annular passage is maintained low by the proper selection of the drop pipes 92. The flow of solids through the passage is maintained just fast enough to prevent the contact material from packing and bridging in the passageway. In this species of the invention wherein the catalyst in the jacket is spent contact material, the seal gas should not contain oxygen or burning of the coke on the catalyst would occur in the passage, thereby raising the temperature of the insulating material. Air could only be used, therefore, as the seal gas if the catalyst temperature in the passage is maintained below the combustion temperature of the coke. The mixing of a small stream of spent solids from the passageway with the main stream of regenerated catalyst can be tolerated without harmful effect. If desired, the solids withdrawn from the annular passage can be recycled to the regeneration zone, and hence the mixing of spent and regenerated catalyst can be avoided.

It is the insulating properties, rather than the cooling properties of the catalyst flowing through the annular passage, which are relied upon in this invention. The rate of flow of solid material through the annular passage kept low; usually only 10 per cent and preferably only one per cent of the catalyst mass flow through the reaction zone. The catalyst mass flow may be conveniently expressed in units of lb./hr. ft.$^2$. Even if the catalyst in the annular space did not flow at all, a temperature gradient would exist horizontally across this stream, since the shell of the vessel may not be insulated except for the catalyst stream. The outer portion of the catalyst stream is cooled, therefore, by radiation to the atmosphere. The catalyst flow in the annular stream is not to keep that stream of solids cool but to insure a compact mass of uniform density and insulating properties all along the shell wall. If there were no flow of solids in the annular passage, there would be a tendency for the catalyst to settle and pack, leaving the upper portion of the catalyst open to convection currents. Also, if hydrocarbon vapors entered the passage, the flow of contact material prevents the coking and solidifying of the particulate material therein.

It is intended that the scope of this invention be considered broadly to cover all changes and modifications of the examples of the invention herein chosen for purposes of disclosure which do not constitute departures from the spirit of the invention.

I claim:

1. The method of converting hydrocarbons at high temperature in the presence of a moving compact mass of solid granular contact material comprising: passing contact material downwardly at elevated conversion temperature through a conversion zone in a reaction vessel as a substantially compact column, passing a substantially compact stream of the solid material downwardly through an annular passage surrounding the conversion zone located between the outer housing wall of the reaction vessel and the conversion zone, at only a small fraction of the rate at which the contact material is passed through the conversion zone, so as to insulate the outer housing wall and maintain it at a temperature substantially below that in the conversion zone, introducing reactant hydrocarbons into the conversion zone, to effect contact with the contact material, removing the hydrocarbon products from said zone, after contact with the granular material and introducing a seal gas into the annular passage, so as to keep the reactant vapors out of said passage.

2. The method of converting hydrocarbons at high temperature in the presence of a moving compact mass of solid granular contact material comprising: gravitating a substantially compact column of contact material downwardly into the top of a reaction vessel, directing a portion of the gravitating stream of solids through a centrally-located conversion zone as a substantially compact column, directing the remainder of the gravitating stream downwardly as a compact column through an annular passage surrounding the conversion zone, located between the outer housing wall of the reaction vessel and the conversion zone, at only a small fraction of the rate at which the contact material is passed through the conversion zone, so as to insulate the outer housing wall and maintain it at a temperature substantially below that in the conversion zone, introducing reactant hydrocarbons into the conversion zone, to effect contact with the contact material, removing the hydrocarbon products from said zone, after contact with the granular material, introducing a seal gas into the annular passage, at a flow rate which is low, so as not to substantially increase the heat conductivity of the insulating solids stream, withdrawing contact material from the bottom of the conversion zone and annular passage, and combining the withdrawn streams of contact material after withdrawal from said conversion zone and said annular passage.

3. The method of converting hydrocarbons at high temperature in the presence of a moving compact mass of solid granular contact material comprising: gravitating a substantially compact column of contact material downwardly above a reaction zone, directing a portion of the gravitating stream of solids through the reaction zone as a substantially compact column, heating the solids in the reaction zone to a temperature substantially higher than the temperature at which they are admitted into said zone, directing the remainder of the gravitating stream of solid material downwardly as a compact column through an annular passage surrounding the reaction zone, at a temperature substantially lower than that of the solids in the reaction zone, so as to act as an insulating medium to inhibit the outward lateral transfer of heat from the reaction zone, introducing reactant hydrocarbons into the reaction zone to effect contact with the contact material, removing the hydrocarbon products from said zone, after contact with the granular material, introducing a seal gas into the annular passage, at a flow rate which is low, so as not to substantially increase the heat conductivity of the insulating solids stream, withdrawing contact material from the bottom of the reaction zone and annular passage and combining the withdrawn streams of contact material after withdrawal from said reaction zone and said annular passage.

4. The method of converting hydrocarbons at high temperature in the presence of a moving compact mass of solid granular contact material comprising: gravitating a substantially compact column of contact material downwardly into the top of a reaction vessel, directing a portion of the gravitating stream of solids through a centrally-located conversion zone as a substantially compact column, directing the remainder of the gravitating stream downwardly as a compact column through an annular passage surrounding the conversion zone, located between the outer wall of the reaction vessel and an inner wall which surrounds the conversion zone, heating the contact material in the conversion zone to a temperature substantially higher than the temperature at which it is admitted to said zone, maintaining the column of contact material surrounding the conversion zone of sufficient lateral thickness to substantially inhibit the lateral transfer of heat from the conversion zone to the outer wall of the vessel, conducting heat from the outer wall of the vessel at a rate which is sufficient to maintain a substantial temperature gradient horizontally across the mass of solid material in the surrounding passage, maintaining the flow rate through the surrounding passage low enough so that the substantial temperature gradient horizontally across the mass of solid material extends along substantially the entire length of the passage, introducing reactant hydrocarbons into the conversion zone, to effect contact with the contact mass, removing the hydrocarbon products from said zone, after contact with the granular material introducing a seal gas into the surrounding passage, at a flow rate which is low, so as not to substantially increase the heat conductivity of the insulating stream of solids, withdrawing contact material from the bottom of the conversion zone and annular passage, and combining the withdrawn streams of contact material into a single stream.

5. A reforming process for upgrading gasoline base stocks at high temperature in the presence of a moving compact mass of solid granular contact material comprising: cooling a stream of hot granular catalyst to a temperature of about 300–650° F., gravitating the cooled catalyst stream into the top of a reformer, directing a portion of the gravitating stream of cooled solids through a centrally-located reforming zone as a substantially compact column, passing a reactant stream of hydrocarbons through the reforming zone at a temperature substantially higher than that at which the solids are introduced into said zone, so that the temperature of the solid mass in the zone is high through most of the length of the solid mass, passing the remainder of the cool entering solids through an annular passage which surrounds the reforming zone, located between an inner and outer wall of the reformer, so as to insulate the outer wall of the reformer, maintaining the reformer under substantial superatmospheric pressure, passing a seal gas through the annular passage at a flow rate which is sufficient to keep the reactant vapors and gas out of the passage, but which does not substantially increase the heat conductivity of the insulating solid material, withdrawing contact material from the bottom of the reforming zone and the annular passage, and combining the withdrawn streams of contact material after withdrawal into a single stream.

6. In a cyclic hydrocarbon conversion system the method for regeneration of a spent granular contact material which comprises: supplying spent contact material to the top of a regeneration vessel at a temperature substantially below the average temperature in the burning zone, directing a part of the solid material downwardly through the burning zone which is centrally located in the regeneration vessel, as a substantially compact mass, heating the solid material in said burning zone to an elevated temperature in the range of about 900–1400° F., passing a combustion-supporting gas through the burning zone to effect combustion of contaminants on the particulate material, passing the remainder of the solid material introduced into the top of the regeneration vessel downwardly through an insulating passage which surrounds the burning zone in the form of a substantially compact column, so as to protect the outer wall of the regeneration vessel from the high burning zone temperature, the flow of the insulating stream of solids being limited to only a minor fraction of the flow of the solids through the burning zone, passing an inert seal gas through the insulating stream to keep combustion-supporting gas out of said stream of solid material in order to prevent burning in the surrounding passage, recombining the central stream of solids and the insulating stream in the lower portion of the regeneration vessel and withdrawing from the bottom of the vessel a single stream of contact material.

7. A reforming process for upgrading gasoline base stocks at high temperature in the presence of a moving compact mass of solid granular contact material comprising: cooling a stream of hot granular catalyst to a temperature of about 300–650° F., gravitating the cooled catalyst stream into the top of a reformer, directing a portion of the gravitating stream of cooled solids through a centrally located reforming zone as a substantially compact column, passing a reactant stream of hydrocarbons through the reforming zone at a temperature substantially higher than that at which the solids are introduced into said zone, so that the temperature of the solid mass in the zone is high through most of the length of the solid mass, passing the remainder of the cool entering solids through an annular passage which surrounds the reforming zone, located between an inner and outer wall of the reformer, so as to insulate the outer wall of the reformer, maintaining the reformer under substantial superatmospheric pressure, passing a seal gas through the annular passage, at a flow rate which is sufficient to keep the reactant vapors and gas out of the passage, but which does not substantially increase the heat conductivity of the insulating solid material, withdrawing contact material from the bottom of the insulating passage and transferring it to the top of the reforming zone, and withdrawing contact material from the bottom of the reforming zone.

8. Apparatus for effecting the continuous conversion of hydrocarbons in the presence of a gravitating mass of hot granular contact material comprising: a vertical vessel, means for introducing granular material into the top of the vessel, means for withdrawing granular material from the bottom of the vessel, continuous inner wall in said vessel spaced apart from the outer wall of the vessel a uniform distance, so as to provide an annular passageway, upper and lower partition plates horizontally located in said vessel within the region enclosed by said inner wall, so as to provide an enclosed reaction chamber, means for conducting granular solids through said upper and lower partition plates, means for introducing reactants into said reaction chamber, means for withdrawing reaction products from said reaction chamber, means for introducing seal gas into said annular passageway to prevent reaction products from entering the passageway and means for restricting the rate at which solids are withdrawn from the bottom of the passageway to a small portion of the flow through the reaction chamber.

9. Apparatus for regenerating a spent contact material comprising in combination: a vertical vessel, means for introducing spent contact material into the top of the vessel, means for withdrawing regenerated contact material from the bottom of the vessel, a continuous wall in said vessel, spaced apart from the outer wall of the vessel a uniform distance, so as to provide a passageway between said inner and outer walls of the vessel, upper and lower partition plates in said vessel, horizontally located to provide a burning chamber within the inner wall of said vessel, means for transferring some of the solid material downwardly through said upper partition plate into said burning chamber, means for transferring the remainder of said solid material downwardly from said upper partition plate into the annular passageway, means for introducing a combustion-supporting gas into said burning chamber, means for withdrawing flue gas from said burning chamber, means for introducing an inert seal gas into said annular passageway to prevent combustion-supporting gas from entering the passageway, means for withdrawing solid material from the burning chamber to the lower portion of the vessel, and means for withdrawing solid material from the passageway to the lower portion of the vessel at a restricted flow rate, whereby the rate of flow of solids through the passageway is restricted to a small fraction of the rate of flow through the burning chamber.

10. The method of converting hydrocarbons at high temperature in the presence of a moving compact mass of solid granular contact material comprising: gravitating a substantially compact column of contact material downwardly into the top of a reaction vessel, directing a portion of the gravitating stream of solids through a centrally-located conversion zone as a substantially compact column, directing the remainder of the gravitating stream downwardly as a compact column through an annular passage surrounding the conversion zone, located between the outer housing wall of the reaction vessel and the conversion zone, at a mass flow only a minor fraction of the mass flow of the contact material in the conversion zone, so as to insulate the outer housing wall and maintain it at a temperature substantially below that in the conversion zone, introducing reactant hydrocarbons into the conversion zone, to effect contact with the contact material, removing the hydrocarbon products from said zone, after contact with the granular material, introducing a seal gas into the annular passage, at a flow rate which is low, so as not to substantially increase the heat conductivity of the insulating solids stream, withdrawing contact material from the bottom of the conversion zone and annular passage, and combining the withdrawn stream of contact material after withdrawal from said conversion zone and said annular passage.

11. The method of converting hydrocarbons at high temperature in the presence of a moving compact mass of solid granular contact material comprising: gravitating a substantially compact column of contact material downwardly into the top of a reaction vessel, directing a portion of the gravitating stream of solids through a centrally-located conversion zone as a substantially compact column, directing the remainder of the gravitating stream downwardly as a compact column through an annular passage surrounding the conversion zone, located between the outer housing wall of the reaction vessel and the conversion zone, at a mass flow approximately 10 per cent of the mass flow of the contact material in the conversion zone, so as to insulate the outer housing wall and maintain it at a temperature substantially below that in the conversion zone, introducing reactant hydrocarbons into the conversion zone, to effect contact with the contact material, removing the hydrocarbon products from said zone, after contact with the granular material, introducing a seal gas into the annular passage, at a flow rate which is low, so as not to substantially increase the heat conductivity of the insulating solids stream, withdrawing contact material from the bottom of the conversion zone and annular passage, and combining the withdrawn stream of contact material after withdrawal from said conversion zone and said annular passage.

12. The method of converting hydrocarbons at high temperature in the presence of a moving compact mass of solid granular contact material comprising: gravitating a substantially compact column of contact material downwardly into the top of a reaction vessel, directing a portion of the gravitating stream of solids through a centrally-located conversion zone as a substantially compact column, directing the remainder of the gravitating stream downwardly as a compact column through an annular passage surrounding the conversion zone, located between the outer housing wall of the reaction vessel and the conversion zone, at a mass flow approximately 1 per cent of the mass flow of the contact material in the conversion zone, so as to insulate the outer housing wall and maintain it at a temperature substantially below that in the conversion zone, introducing reactant hydrocarbons into the conversion zone, to effect contact with the contact material, removing the hydrocarbon products from said zone, after contact with the granular material, introducing a seal gas into the annular passage, at a flow rate which is low, so as not to substantially increase the heat conductivity of the insulating solids stream, withdrawing contact material from the bottom of the conversion zone and annular passage, and combining the withdrawn stream of contact material after withdrawal from said conversion zone and said annular passage.

13. The method of continuously contacting a fluid with granular contact material which possesses good insulating qualities at high temperature which comprises: gravitating solid contact material downwardly through a central reaction zone as a compact column, passing a contacting fluid through the central reaction zone, so as to contact the granular material, gravitating a laterally separated annular column of said contact material downwardly about the reaction zone, at only a fraction of the mass flow rate of the column in the reaction zone, so as to insulate the housing wall confining said annular column, and maintain it at a temperature substantially below that in the conversion zone, and introducing a seal gas into the annular column, at a pressure sufficiently high only to keep contacting fluid out of said annular column.

References Cited in the file of this patent

UNITED STATES PATENTS

| | | |
|---|---|---|
| 2,215,532 | Richardson | Sept. 24, 1940 |
| 2,548,286 | Bergstrom | Apr. 10, 1951 |

FOREIGN PATENTS

| | | |
|---|---|---|
| 51,770 | Norway | Sept. 6, 1930 |